(12) United States Patent
Weng et al.

(10) Patent No.: US 11,798,172 B2
(45) Date of Patent: *Oct. 24, 2023

(54) MAXIMUM TEMPERATURE POINT TRACKING METHOD, DEVICE AND UNMANNED AERIAL VEHICLE

(71) Applicant: SZ DJI TECHNOLOGY CO., LTD., Shenzhen (CN)

(72) Inventors: Chao Weng, Shenzhen (CN); Mingxi Wang, Shenzhen (CN); Wei Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,670

(22) Filed: Oct. 18, 2021

(65) Prior Publication Data
US 2022/0038633 A1   Feb. 3, 2022

Related U.S. Application Data

(63) Continuation of application No. 16/728,383, filed on Dec. 27, 2019, now Pat. No. 11,153,494, which is a (Continued)

(51) Int. Cl.
*G06T 7/246* (2017.01)
*H04N 23/695* (2023.01)
(Continued)

(52) U.S. Cl.
CPC .......... *G06T 7/246* (2017.01); *G06V 10/143* (2022.01); *G06V 20/176* (2022.01); *H04N 23/695* (2023.01)

(58) Field of Classification Search
CPC .......... G05D 2201/0207; B25J 9/1697; G01J 2005/0081; G01J 2005/0085; G01S 17/86; H04W 4/026; H04W 4/027
See application file for complete search history.

(56) References Cited

U.S. PATENT DOCUMENTS 4,189,747 A * 2/1980 Funari .................. G01S 3/7864
250/203.5
5,062,586 A * 11/1991 Hobson .................... F41G 7/32
244/3.12
(Continued)

FOREIGN PATENT DOCUMENTS

CN         101046908 A      10/2007
CN         101419055 A       4/2009
(Continued)

OTHER PUBLICATIONS

C. Yuan, Z. Liu and Y. Zhang, "Fire detection using infrared images for UAV-based forest fire surveillance," 2017 International Conference on Unmanned Aircraft Systems (ICUAS), 2017, pp. 567-572, doi: 10.1109/ICUAS.2017.7991306. (Year: 2017).*
(Continued)

*Primary Examiner* — Daniel Chang
(74) *Attorney, Agent, or Firm* — ANOVA LAW GROUP, PLLC (57) ABSTRACT

A method for tracking a maximum temperature point includes acquiring a first pair of coordinates of a maximum temperature point in a current frame of image sensed by an infrared camera, determining a rotation angle of a gimbal equipped with the infrared camera according to the first pair of coordinates of the maximum temperature point in the current frame of image and a pair of coordinates of a target position of the maximum temperature point in a subsequent frame of image, and controlling the gimbal to rotate according to the rotation angle, so as to adjust the maximum temperature point in the subsequent frame of image captured by the infrared camera to be located at the target position.

20 Claims, 5 Drawing Sheets

Related U.S. Application Data continuation of application No. PCT/CN2017/113800, filed on Nov. 30, 2017.

(51) Int. Cl.
　　*G06V 10/143* (2022.01)
　　*G06V 20/10* (2022.01)

(56) References Cited

U.S. PATENT DOCUMENTS

| | | | |
|---|---|---|---|
| 5,262,630 A | 11/1993 | Kordulla | |
| 5,489,099 A * | 2/1996 | Rankin | A63B 24/0003 473/409 |
| 5,918,305 A * | 6/1999 | Livingston | F41H 13/0062 89/41.01 |
| 5,960,097 A | 9/1999 | Pfeiffer et al. | |
| 5,983,157 A * | 11/1999 | Sugitani | G01P 13/045 701/28 |
| 6,179,246 B1 * | 1/2001 | Fisel | F41G 7/2213 244/3.15 |
| 8,483,437 B2 | 7/2013 | Shamaie | |
| 8,723,079 B2 * | 5/2014 | Martin | H05K 3/3494 219/121.85 |
| 8,946,606 B1 * | 2/2015 | Dennison | F41G 7/2293 382/103 |
| 10,178,290 B2 * | 1/2019 | Stoker | H04N 23/611 |
| 10,679,054 B2 * | 6/2020 | Zheng | G06T 7/62 |
| 2006/0238414 A1 | 10/2006 | Miyamoto et al. | |
| 2008/0055413 A1 * | 3/2008 | Hayashi | H04N 13/221 348/169 |
| 2009/0021581 A1 | 1/2009 | Sun et al. | |
| 2009/0096994 A1 * | 4/2009 | Smits | H04N 9/3194 353/30 |
| 2010/0142759 A1 * | 6/2010 | Ridley | E02F 9/2808 382/107 |
| 2010/0157056 A1 * | 6/2010 | Zohar | G01S 13/66 348/148 |
| 2011/0012719 A1 * | 1/2011 | Hilger | H04N 7/181 382/103 |
| 2011/0081043 A1 * | 4/2011 | Sabol | G06T 7/254 382/103 |
| 2011/0304737 A1 * | 12/2011 | Evans | G01S 17/66 250/203.1 |
| 2012/0200703 A1 * | 8/2012 | Nadir | H04N 25/443 348/E7.085 |
| 2012/0218411 A1 * | 8/2012 | Wu | G01N 25/72 348/148 |
| 2012/0287274 A1 * | 11/2012 | Bevirt | H04N 7/185 348/E7.085 |
| 2012/0307042 A1 * | 12/2012 | Lee | H04N 23/635 348/114 |
| 2013/0021475 A1 * | 1/2013 | Canant | H04N 5/33 348/E5.09 |
| 2013/0048855 A1 * | 2/2013 | Abreo | H04N 5/33 250/330 |
| 2013/0242091 A1 * | 9/2013 | Park | G08B 13/196 348/143 |
| 2013/0278759 A1 * | 10/2013 | Zimmermann | G01C 7/00 348/140 |
| 2014/0192184 A1 * | 7/2014 | Wu | G08B 17/125 348/135 |
| 2014/0334668 A1 * | 11/2014 | Saund | B64D 47/08 382/103 |
| 2014/0336848 A1 * | 11/2014 | Saund | G06V 10/255 701/3 |
| 2015/0370250 A1 * | 12/2015 | Bachrach | G05D 1/0044 701/2 |
| 2016/0034731 A1 * | 2/2016 | Lin | G01S 5/16 340/10.1 |
| 2016/0037080 A1 * | 2/2016 | Mcclatchie | G06T 7/50 348/144 |
| 2016/0171330 A1 | 6/2016 | Mentese et al. | |
| 2016/0187125 A1 | 6/2016 | Corella et al. | |
| 2016/0214713 A1 * | 7/2016 | Cragg | B64D 47/08 |
| 2017/0073070 A1 * | 3/2017 | Xing | B60F 3/0061 |
| 2017/0134631 A1 * | 5/2017 | Zhao | G06V 20/10 |
| 2017/0299771 A1 | 10/2017 | Fendell | |
| 2018/0025498 A1 * | 1/2018 | Omari | G06T 7/74 348/144 |
| 2018/0046187 A1 * | 2/2018 | Martirosyan | B64C 39/024 |
| 2018/0189971 A1 * | 7/2018 | Hildreth | A63H 27/12 |
| 2018/0204331 A1 * | 7/2018 | Omari | B64D 47/08 |
| 2019/0025858 A1 * | 1/2019 | Bar-Nahum | G08G 5/0069 |
| 2019/0050000 A1 * | 2/2019 | Kennedy | G06V 20/17 |
| 2019/0242711 A1 * | 8/2019 | Ingersoll | G01C 21/1652 |
| 2019/0250640 A1 * | 8/2019 | O'Flaherty | G05D 1/042 |
| 2019/0258255 A1 * | 8/2019 | Nagayama | H04N 5/222 |
| 2019/0304105 A1 * | 10/2019 | Gao | G06V 10/454 |
| 2019/0377345 A1 * | 12/2019 | Bachrach | G05D 1/0094 |
| 2019/0378423 A1 * | 12/2019 | Bachrach | G06T 19/003 |
| 2020/0108924 A1 * | 4/2020 | Smith | B64D 1/02 |
| 2020/0108925 A1 * | 4/2020 | Smith | B64C 39/024 |
| 2020/0108926 A1 * | 4/2020 | Smith | B64C 39/024 |
| 2020/0263958 A1 * | 8/2020 | Levy | F41G 7/2293 |

FOREIGN PATENT DOCUMENTS

| | | |
|---|---|---|
| CN | 102831620 A | 12/2012 |
| CN | 105049733 A | 11/2015 |
| CN | 204822071 U | 12/2015 |
| CN | 105212418 A | 1/2016 |
| CN | 105718895 A | 6/2016 |
| CN | 106029501 A | 10/2016 |
| CN | 106197422 A | 12/2016 |
| CN | 106297142 A | 1/2017 |
| CN | 106558181 A | 4/2017 |
| CN | 107003386 A | 8/2017 |
| WO | 2017080029 A1 | 5/2017 |

OTHER PUBLICATIONS

V. Sherstjuk, M. Zharikova and I. Sokol, "Forest Fire Monitoring System Based on UAV Team, Remote Sensing, and Image Processing," 2018 IEEE Second International Conference on Data Stream Mining & Processing (DSMP), 2018, pp. 590-594, doi: 10.1109/DSMP.2018.8478590. (Year: 2018).*

The World Intellectual Property Organization (WIPO) International Search Report for PCT/CN2017/113800 dated Aug. 16, 2018 7 Pages (including translation).

Zdenek Hurak, et al., Image-Based Pointing and Tracking for Inerlially Stabilized Airborne Camera Platform, IEEE Transactions on Control Systems Technology, Sep. 2012, vol. 20, No. 5.

Xiaoli Tang, et al., Fluoroscopic Tracking of Multiple Implanted Fiducial Markers Using Multiple Object Tracking, Physics Medicine and Biology, Jul. 2007, pp. 4081-4098, IOP Publishing.

Rafael Beserra Gomes, et al, Visual Attention Guided Features Selection with Foveated Images, Neurocomputing Mar. 2013, Elsevier.

Mani Monajjemi et al. UAV Come to me : End-to-End, Multi-Scale Situated HRI with an Unmstmmented Human and a Distant UAV, IEEE/RSJ International Conference Intelligent Robots and Systems (IROS), Oct. 2016.

Luis Merino, et al., A Cooperative Perception System for Multiple UAVs: Application to Automatic Detection of Forest Fires, Journal of Field Robotics, Apr. 2006, pp. 165-184, vol. 23, Iss. 3-4.

Le Maoult et al: "Fire Detection". Process Safety and Environmental Protection.Institution of Chemical Engineers, Rugby, GB, vol. 85, No. 3, Jan. 1, 2007 (Jan. 1, 2007 ), pp. 193-206.

Denenv Nison P E et al"Daytlme 白 re detection using airborne hyperspectral data", Remote Sensing of Environment, Elsevier, XX, vol. 113, No. 8, Aug. 1, 2009 (Aug. 1, 2009), pp. 1646-1657.

* cited by examiner

MAXIMUM TEMPERATURE POINT TRACKING METHOD, DEVICE AND UNMANNED AERIAL VEHICLE

CROSS-REFERENCE TO RELATED APPLICATIONS

This application is a continuation of U.S. application Ser. No. 16/728,383, filed on Dec. 27, 2019, which is a continuation of International Application No. PCT/CN2017/113800, filed on Nov. 30, 2017, the entire contents of both of which are incorporated herein by reference.

TECHNICAL FIELD

The present disclosure relates to the field of unmanned aerial vehicle technology and, more particularly, to a maximum temperature point tracking method, device and unmanned aerial vehicle thereof.

BACKGROUND

A gimbal may be installed on an unmanned aerial vehicle (UAV). A camera may be mounted on the gimbal and used to capture images. Therefore, during the flight of the UAV, the UAV may output an image captured by the camera to the control terminal, which then displays the image captured by the camera on a graphical user interface. Here, the camera mounted on the gimbal may be an infrared camera, which may sense the thermodynamic temperature of each object in the image captured by the camera. Since the thermodynamic temperature of each object in the image captured by the infrared camera may be different, the color depth of each object in the infrared image displayed on the control terminal will also be different. The higher the temperature of the object, the deeper the color of the object in the image. Therefore, the image captured by the infrared camera mounted on the UAV may be used to help firefighters locate fire sources in houses, detect crop health, and conduct search and rescue operations with police dogs. However, in some applications, the maximum temperature point of the image needs to be displayed at the center of the image in real time. Due to the presence of dynamic objects in the captured image or during the flight of the UAV, the position of the maximum temperature point may change, which then causes the maximum temperature point to be not located at the center of the shooting frame.

SUMMARY

In accordance with the present disclosure, there is provided a method for tracking a maximum temperature point. In the method, a first pair of coordinates of a maximum temperature point in an image sensed by an infrared camera is acquired, where the image is an image captured by the infrared camera. A rotation angle of a gimbal equipped with the infrared camera is then determined according to the first pair of coordinates of the maximum temperature point and a pair of coordinates of a target position in the image. The gimbal is controlled to rotate according to the determined rotation angle, so as to adjust the maximum temperature point in the image captured by the infrared camera to be located at the target position.

DETAILED DESCRIPTION OF THE EMBODIMENTS

To make the objective, technical solutions, and advantages of the present disclosure clearer, the technical solutions of the embodiments of the present disclosure will be made in detail hereinafter with reference to the accompanying drawings of the disclosed embodiments. Apparently, the disclosed embodiments are merely some, but not all, of the embodiments of the present disclosure. Various other embodiments obtained by a person of ordinary skills in the art based on the embodiments of the present disclosure without creative efforts still fall within the protection scope of the present disclosure.

Embodiments of the present disclosure provide a method, a device, and a UAV for tracking the maximum temperature point. The UAV may be a rotorcraft, for example, a multi-rotor rotorcraft propelled through air by a plurality of propulsion apparatuses, but the embodiments of the present disclosure are not limited thereto.

Figure 1:
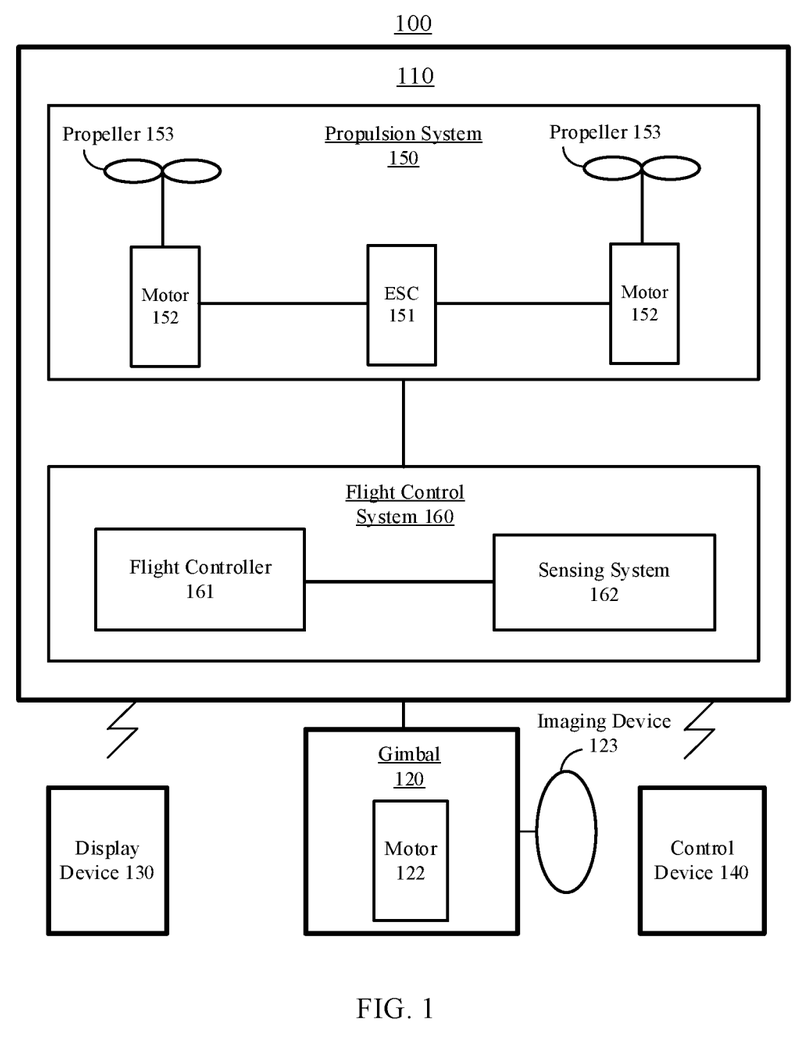
FIG. 1 is a schematic architecture diagram of an unmanned aerial system according to an embodiment of the present disclosure.

FIG. 1 is a schematic architecture diagram of an unmanned flight system 100 according to an embodiment of the present disclosure. The illustrated embodiment is described by taking a rotorcraft UAV as an example.

The unmanned aerial system 100 may include a UAV 110, a gimbal 120, a display device 130, and a control device 140. The UAV 110 may include a propulsion system 150, a flight control system 160, and a frame. The UAV 110 may perform wireless communication with the control device 140 and the display device 130.

The frame may include a fuselage and a stand (may also be referred to as "landing gear"). The fuselage may include a central frame and one or more arms connected to the central frame. The one or more arms extend radially from the central frame. The stand is connected to the fuselage and is used to support the UAV 110 during its landing.

The propulsion system 150 may include one or more electronic speed controllers (ESCs) 151, one or more propellers 153, and one or more motors 152 coupled to the one or more propellers 153, where the motors 152 are disposed between the ESCs 151 and the propellers 153, and the motors 152 and the propellers 153 are disposed on the arms of the UAV 110. An ESC 151 is configured to receive a driving signal generated by the flight control system 160 and provide a driving current to a motor 152 according to the driving signal, to control the rotation speed of the motor 152. A motor 152 is configured to drive the corresponding propeller to rotate, thereby providing propulsion for the flight of the UAV 110. The propulsion enables the UAV 110 to achieve one or more degrees of freedom of movement. In some embodiments, the UAV 110 may rotate around one or more rotation axes. The rotation axes, for example, may include a roll axis, a yaw axis, and a pitch axis. It should be noted that a motor 152 may be a DC motor or an AC motor. In addition, a motor 152 may be a brushless motor or a brushed motor.

The flight control system 160 may include a flight controller 161 and a sensing system 162. The sensing system 162 is configured to measure the attitude information of the UAV. The attitude information includes the position information and status information of the UAV 110 in space, such as three-dimensional position, three-dimensional angle, three-dimensional velocity, three-dimensional acceleration, and three-dimensional angular velocity. The sensing system 162 may include, for example, at least one of a gyroscope, an ultrasonic sensor, an electronic compass, an inertial measurement unit (IMU), a vision sensor, a global navigation satellite system, and a barometer. The global navigation satellite system may be, for example, a global positioning system (GPS). The flight controller 161 is configured to control the flight of the UAV 110. For example, the flight controller 161 may control the flight of the UAV 110 according to the attitude information measured by the sensing system 162. It should be noted that the flight controller 161 may control the UAV 110 according to a pre-programmed program instruction, or may also control the UAV 110 by responding to one or more control instructions from the control device 140.

The gimbal 120 may include a motor 122. The gimbal is used to carry an imaging device 123. The flight controller 161 may control the movement of the gimbal 120 through the motor 122. Optionally, in some embodiments, the gimbal 120 may also include a controller for controlling the movement of the gimbal 120 by controlling the motor 122. It should be noted that the gimbal 120 may be independent of the UAV 110 or may be a part of the UAV 110. It should be also noted that the motor 122 may be a DC motor or an AC motor. In addition, the motor 122 may be a brushless motor or a brushed motor. It should be noted also that the gimbal may be located on the top of the UAV or at the bottom of the UAV.

The imaging device 123 may be, for example, a device for capturing an image, such as a camera or a video camera. The imaging device 123 may communicate with the flight controller and perform shooting under the control of the flight controller. The imaging device 123 in the disclosed embodiments includes at least a photosensitive element, such as a complementary metal oxide semiconductor sensor (CMOS) or a charge-coupled device (CCD) sensor.

The display device 130 is arranged on the ground side of the unmanned aerial system 100. The display device 130 may wirelessly communicate with the UAV 110, and may be used to display attitude information of the UAV 110. In addition, an image captured by the imaging device may also be displayed on the display device 130. It should be noted that the display device 130 may be an independent device, or may be integrated into the control device 140.

The control device 140 is arranged on the ground side of the unmanned aerial system 100, and may wirelessly communicate with the UAV 110 for remotely controlling the UAV 110.

It should be noted that the above naming of each component of the unmanned aerial system is for identification purposes only, and should not be construed as limiting the embodiments of the present disclosure.

Figure 2:
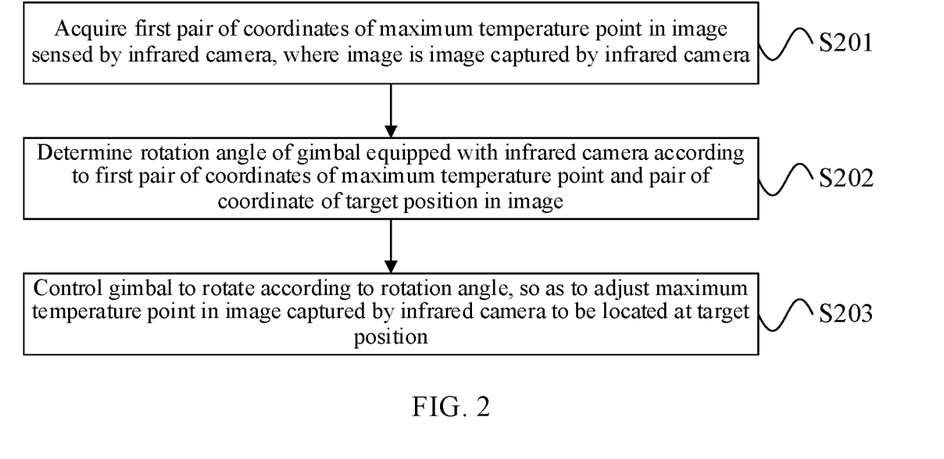
FIG. 2 is a flowchart of a method for tracking the maximum temperature point according to an embodiment of the present disclosure.

FIG. 2 is a flowchart of a method for tracking a maximum temperature point according to an embodiment of the present disclosure. As shown in FIG. 2, the method in the illustrated embodiment may include:

S201: Acquire a first pair of coordinates of a maximum temperature point in an image sensed by an infrared camera, where the image is an image captured by the infrared camera.

In the disclosed embodiments, an infrared camera may be configured to capture an image. When capturing an image, the infrared camera may sense the temperature in the image. In some positions of the image, the temperature is high, while in other positions, the temperature is low. Among these temperatures, there exists a highest temperature. The position corresponding to the highest temperature is referred to as the maximum temperature point. The pair of coordinates of the maximum temperature point may be then acquired accordingly. Here, the acquired pair of coordinates of the maximum temperature point in the image is called the first pair of coordinates.

S202: Determine a rotation angle of the gimbal equipped with the infrared camera according to the first pair of coordinates of the maximum temperature point and the pair of coordinates of a target position in the image.

S203: Control the rotation of the gimbal according to the rotation angle, so as to adjust the maximum temperature point in the image captured by the infrared camera to be located at the target position.

In some embodiments, the rotation angle of the gimbal is determined according to the first pair of coordinates of the maximum temperature point in the image and the pair of coordinates of the target position in the image. The gimbal is equipped with an infrared camera. The gimbal is controlled to rotate according to the rotation angle. For example, since the infrared camera is mounted on the gimbal, by controlling the gimbal to rotate the aforementioned rotation angle, the rotation of the gimbal drives the rotation of the infrared camera, so that the infrared camera may be adjusted to allow the maximum temperature point in the image captured by the infrared camera to be located at the target position.

In the disclosed embodiments, the first pair of coordinates of the maximum temperature point in the image sensed by the infrared camera is acquired, and the rotation angle of the gimbal equipped with the infrared camera is determined according to the first pair of coordinates of the maximum temperature point and the pair of coordinates of the target position in the image. The gimbal is controlled to rotate according to the rotation angle to adjust the maximum temperature point in the image captured by the infrared camera to be located at the target position. This then allows the infrared camera to automatically track the maximum temperature point in capturing an image. No matter how the maximum temperature point changes, the maximum temperature point will remain at the target position in the image captured by the infrared camera, which is convenient for a user to observe the maximum temperature point.

In some embodiments, after S203 is performed, the image captured by the infrared camera is further displayed on the display interface, where the maximum temperature point in the image is located at the target position of the image. A user may accurately determine the maximum temperature point through the target position of the image displayed on the display interface.

In some embodiments, the target position is the exact center of the image. In this way, when observing the maximum temperature point, a user only needs to observe the exact center of the image to quickly and clearly identify the maximum temperature point.

Figure 3:
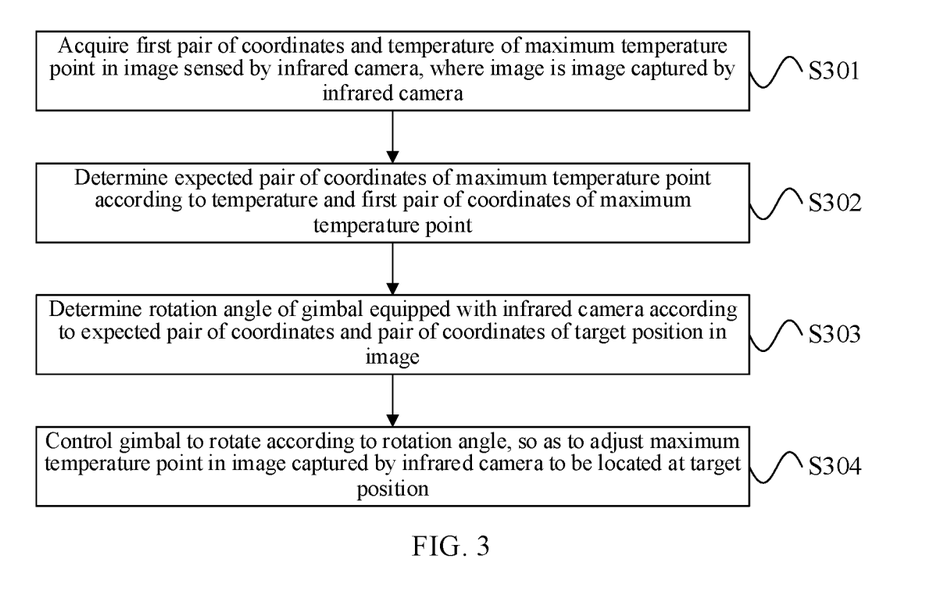
FIG. 3 is a flowchart of a method for tracking the maximum temperature point according to another embodiment of the present disclosure.

FIG. 3 is a flowchart of a method for tracking a maximum temperature point according to another embodiment of the present disclosure. As shown in FIG. 3, the method in the illustrated embodiment may include:

S301: Acquire the first pair of coordinates and the temperature of the maximum temperature point in the image sensed by the infrared camera, where the image is an image captured by the infrared camera.

In the disclosed embodiments, not only the pair of coordinates (i.e., the first pair of coordinates) of the maximum temperature point in the image is sensed by the infrared camera, but also the temperature of the maximum temperature point is sensed by the infrared camera. Accordingly, an implementation of S202 includes the following S302-S303.

S302: Determine an expected pair of coordinates of the maximum temperature point according to the temperature and the first pair of coordinates of the maximum temperature point.

S303: Determine the rotation angle of the gimbal equipped with the infrared camera according to the expected pair of coordinates and the pair of coordinates of the target position in the image.

In the disclosed embodiments, according to the temperature and the first pair of coordinates of the maximum temperature point, an expected pair of coordinates of the maximum temperature point, that is, a pair of coordinates of the expected maximum temperature point, may be determined. Next, according to the expected pair of coordinates of the maximum temperature point and the pair of coordinates of the target position in the image, the rotation angle of the gimbal is determined.

For a specific process of rotating from one pair of coordinates position to another pair of coordinates position according to the above pairs of coordinates, refer to related descriptions in the existing technologies, details of which are not described herein again.

S304: Control the gimbal to rotate according to the rotation angle, so as to adjust the maximum temperature point in the image captured by the infrared camera to be located at the target position.

In the disclosed embodiments, the specific implementation process of S304 may refer to the related description in the embodiments shown in FIG. 2, details of which will not be repeated herein again.

In the disclosed embodiments, the first pair of coordinates and the temperature of the maximum temperature point in the image sensed by the infrared camera are acquired, and then the expected pair of coordinates of the maximum temperature point is determined according to the temperature and the first pair of coordinates of the maximum temperature point. According to the expected pair of coordinates and the pair of coordinates of the target position in the image, the rotation angle of the gimbal equipped with the infrared camera is determined. According to the rotation angle, the gimbal is controlled to rotate, so as to adjust the maximum temperature point in the image captured by the infrared camera to be located at the target position in the image. Since the expected pair of coordinates of the maximum temperature point may be predefined in the disclosed embodiments, through adjusting the gimbal, the infrared camera may capture the maximum temperature point to the target position in the image, thereby accomplishing automatic tracking of the maximum temperature point when the infrared camera captures an image. Regardless of the change of the maximum temperature point, the maximum temperature point will be positioned at the target position in the image captured by the infrared camera, which is convenient for users to observe the maximum temperature point.

In some embodiments, one implementation of the above S302 includes: taking the above image as the current frame of image as an example, after obtaining the temperature of the maximum temperature point in the current frame of image sensed by the infrared camera, determining whether the temperature of the maximum temperature point sensed by the infrared camera falls within a maximum temperature confidence interval; if the temperature of the maximum temperature point sensed by the infrared camera falls within the maximum temperature confidence interval, determining the expected pair of coordinates through two implementation schemes:

Scheme I: determining the first pair of coordinates of the maximum temperature point in the current frame of image as the expected pair of coordinates of the maximum temperature point. That is, the expected pair of coordinates of the maximum temperature point is the same as the first pair of coordinates.

Scheme II: determining the expected pair of coordinates according to the first pair of coordinates of the maximum temperature point in the current frame of image and the first pairs of coordinates of the maximum temperature points of N frames of images sensed by the infrared camera before the current frame. Here, the N frames of images are consecutive N frames of images in which the temperatures of the maximum temperature points fall within the maximum temperature confidence interval, and N is an integer greater than or equal to 1.

For example, if the current frame of image is the $T^{th}$ frame of image, then according to the pairs of coordinates of the maximum temperature points of the $(T-N)^{th}$ frame of image, the $(T-(N-1))^{th}$ frame of image, ..., the $(T-1)^{th}$ frame of image, and the $T^{th}$ frame of image detected by the infrared camera, determine the expected pair of coordinates of the maximum temperature point. Here, the temperatures of the maximum temperature points in the $(T-N)^{th}$ frame of image, the $(T-(N-1))^{th}$ frame of image, ..., the $(T-1)^{th}$ frame of image, and the $T^{th}$ frame of image all fall within the maximum temperature confidence interval.

Optionally, if the temperature of the maximum temperature point in the $(T-(N-1))^{th}$ frame of image does not fall within the maximum temperature confidence interval but the temperature of the maximum temperature point in the $(T-(N+1))^{th}$ frame of image falls within the maximum temperature confidence interval, then the N frames of images before the current frame includes: $(T-(N+1))^{th}$ frame of image, $(T-N)^{th}$ frame of image, $(T-(N-2))^{th}$ frame of image, ..., $(T-1)^{th}$ frame of image, and $T^{th}$ frame of image. The following described temperatures of the maximum temperature points in the K frames of images, before the current frame, within the maximum temperature confidence interval may also refer to the description here.

Here, the determination of whether the temperature of the maximum temperature point in a frame of image falls within the maximum temperature confidence interval is mainly based on whether the variance or the standard deviation between the temperature of the maximum temperature point in the frame of image and the temperatures of the maximum temperature points in the K frames of images before the frame of image is smaller than a preset value. Here, if the current frame of image is the $T^{th}$ frame of image, the K frames of images before the current frame of image include: $(T-K)^{th}$ frame of image, $(T-(K-1))^{th}$ frame of image, ..., and $(T-1)^{th}$ frame of image.

For the other frames of images, may refer to the current frame of image as an example in determining whether the temperature of the maximum temperature point in a frame of image falls within the maximum temperature confidence interval, details of which will not be repeated herein again.

Specifically, determine whether the variance between the temperature of the maximum temperature point in the current frame of image and the temperatures of the maximum temperature points in the K frames of images before the current frame of image (i.e., K+1 number of temperatures) is less than a preset value; if the variance between the temperature of the maximum temperature point in the current frame of image and the temperatures of the maximum temperature points in the K frames of images before the current frame of image (i.e., K+1 number of temperatures) is less than a preset value, determine that the temperature of the maximum temperature point in the current frame of image falls within the maximum temperature confidence interval; if the variance between the temperature of the maximum temperature point in the current frame of image and the temperatures of the maximum temperature points in the K frames of images before the current frame of image (i.e., K+1 number of temperatures) is greater than or equal to the preset value, determine that the temperature of the maximum temperature point in the current frame of image does not fall within the maximum temperature confidence interval.

Alternatively, determine whether the standard deviation between the temperature of the maximum temperature point in the current frame of image and the temperatures of the maximum temperature points in the K frames of images before the current frame of image (i.e., K+1 number of temperatures) is less than a preset value; if the standard deviation between the temperature of the maximum temperature point in the current frame of image and the temperatures of the maximum temperature points in the K frames of images before the current frame of image (i.e., K+1 number of temperatures) is less than the preset value, determine that the temperature of the maximum temperature point in the current frame of image falls within the maximum temperature confidence interval; if the standard deviation between the temperature of the maximum temperature point in the current frame of image and the temperatures of the maximum temperature points in the K frames of images before the current frame of image (i.e., K+1 number of temperatures) is greater than or equal to the preset value, determine that the temperature of the maximum temperature point in the current frame of image does not fall within the maximum temperature confidence interval.

Determining the expected pair of coordinates according to the first pair of coordinates of the maximum temperature point in the current frame of image and the first pairs of coordinates of the maximum temperature points in the N frames of images sensed by the infrared camera before the current frame of image may include the following implementations, but the disclosed embodiments are not limited thereto.

In one implementation, the first pairs of coordinates of the maximum temperature points in the N frames of images before the current frame of image and the first pair of coordinates of the maximum temperature point in the current frame of image are subjected to an operation of a least squares method to obtain the expected pair of coordinates. For example, the first pair of coordinates of the maximum temperature point in the $(T-N)^{th}$ frame of image sensed by the infrared camera, the first pair of coordinates of the maximum temperature point in the $(T-(N-1))^{th}$ frame of image sensed by the infrared camera, ..., the first pair of coordinates of the maximum temperature point in the $(T-1)^{th}$ frame of image sensed by the infrared camera, and the first pair of coordinates of the maximum temperature point in the $T^{th}$ frame of image sensed by the infrared camera (i.e., N+1 number of pairs of coordinates) are subjected to an operation of a least squares method. The calculated result is determined as the expected pair of coordinates.

In another implementation, the expected pair of coordinates is determined according to an average value of the first pairs of coordinates of the maximum temperature points in the N frames of images before the current frame of image and the first pair of coordinates of the maximum temperature point in the current frame of image. For example, the average of the first pair of coordinates of the maximum temperature point in the $(T-N)^{th}$ frame of image sensed by the infrared camera, the first pair of coordinates of the maximum temperature point in the $(T-(N-1))^{th}$ frame of image sensed by the infrared camera, ..., the first pair of coordinates of the maximum temperature point in the $(T-1)^{th}$ frame of image sensed by the infrared camera, and the first pair of coordinates of the maximum temperature point in the $T^{th}$ frame of image sensed by the infrared camera (i.e., N+1 number of pairs of coordinates) is determined as the expected pair of coordinates.

In yet another implementation, the expected pair of coordinates is determined according to a weighted average of the first pairs of coordinates of the maximum temperature points in the N frames of images before the current frame of image and the first pair of coordinates of the maximum temperature point in the current frame of image. For example, the weighted average of the first pair of coordinates of the maximum temperature point in the $(T-N)^{th}$ frame of image sensed by the infrared camera, the first pair of coordinates of the maximum temperature point in the (T-(N-1))th frame of image sensed by the infrared camera, ..., the first pair of coordinates of the maximum temperature point in the $(T-1)^{th}$ frame of image sensed by the infrared camera, and the first pair of coordinates of the maximum temperature point in the $T^{th}$ frame of image sensed by the infrared camera (i.e., N+1 number of pairs of coordinates) is determined as the expected pair of coordinates.

In some embodiments, if the temperature of the maximum temperature point in the current frame of image does not fall within the maximum temperature confidence interval, an expected pair of coordinates determined last time is determined as the current expected pair of coordinates. That is, the expected pair of coordinates determined last time is the expected pair of coordinates to be determined in S302.

Figure 4:
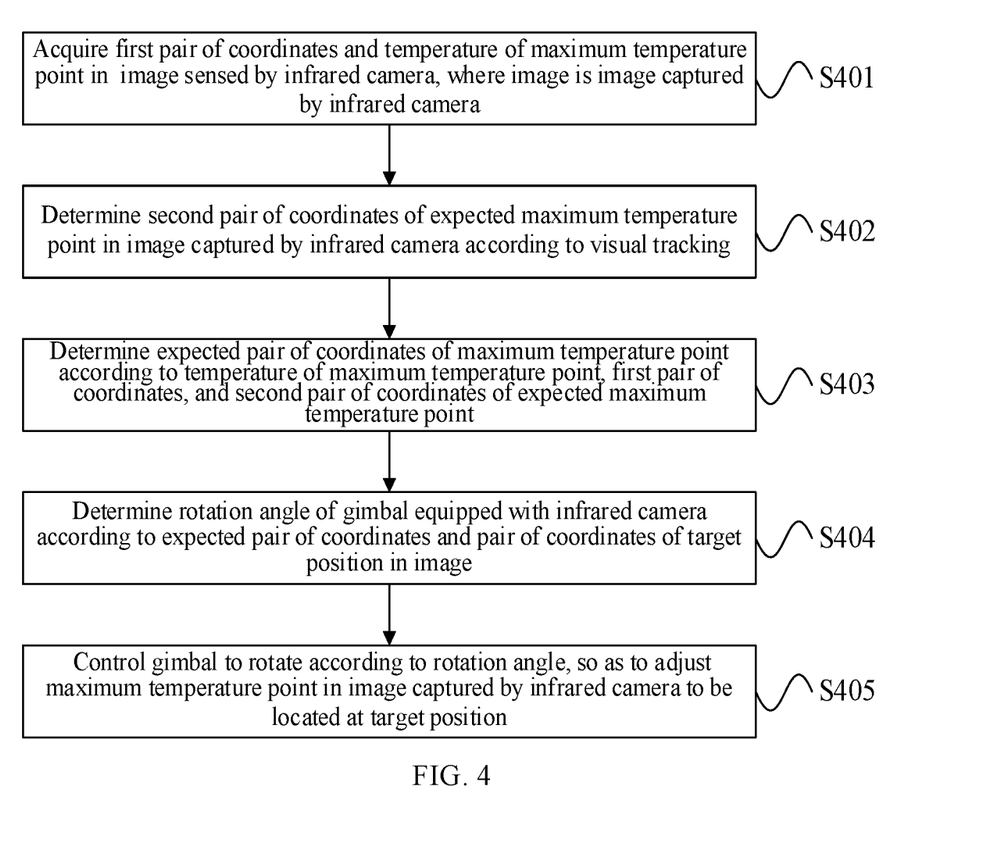
FIG. 4 is a flowchart of a method for tracking the maximum temperature point according to yet another embodiment of the present disclosure.

FIG. 4 is a flowchart of a method for tracking a maximum temperature point according to another embodiment of the present disclosure. As shown in FIG. 4, the method in the illustrated embodiment may include:

S401: Acquire a first pair of coordinates and a temperature of a maximum temperature point in an image sensed by an infrared camera, where the image is an image captured by the infrared camera.

For the specific implementation process of S401 in the illustrated embodiment, refer to the related description in the embodiments shown in FIG. 3, details of which will not be repeated here.

S402: Determine a second pair of coordinates of the expected maximum temperature point in the image captured by the infrared camera according to visual tracking.

Here, the executions of S401 and S402 are not necessarily in the illustrated order.

In the disclosed embodiments, according to visual tracking, the expected maximum temperature point in the image captured by the infrared camera may be determined, so that the pair of coordinates of the expected maximum temperature point may be determined. Here, the pair of coordinates of the expected maximum temperature point determined by visual tracking may be referred to as the second pair of coordinates.

In some embodiments, before performing S402, a bitstream feature of an expected maximum temperature point is also obtained. Correspondingly, a possible implementation of S402 may include: S4021 and S4022.

S4021: Obtain an infrared bitstream of the image captured by the infrared camera.

S4022: Visually track the infrared bitstream according to the bitstream feature, to determine the second pair of coordinates.

In the disclosed embodiments, the obtained bitstream feature of the expected maximum temperature point may be a feature of an infrared bitstream. In the disclosed embodiments, an infrared bitstream of an image may be obtained, where the image is an image collected by an infrared camera. The infrared bitstream of the image is visually tracked according to the bitstream feature of the expected maximum temperature point, so that the second pair of coordinates of the expected maximum temperature point in the image may be determined.

For a specific implementation process of the visual tracking, refer to related descriptions in the existing technologies, details of which are not described herein again.

Here, the bitstream feature may be obtained in real time, or may be stored in the memory in advance.

One implementation to obtain the bitstream feature in real time includes: determine the bitstream feature of the expected maximum temperature point according to the bitstream features of the maximum temperature points corresponding to the expected pairs of coordinates determined in the previous M times, where M is an integer greater than or equal to 1. In doing so, after determining an expected pair of coordinates, the bitstream feature of the maximum temperature point corresponding to that expected pair of coordinates in an image may also be obtained. The current bitstream feature of the expected maximum temperature point is then determined according to the bitstream features of the maximum temperature points corresponding to the expected pairs of coordinates determined in the previous M times.

S403: Determine the expected pair of coordinates of the maximum temperature point according to the temperature of the maximum temperature point, the first pair of coordinates, and the second pair of coordinates of the expected maximum temperature point.

In the disclosed embodiments, the expected pair of coordinates of the maximum temperature point is determined according to the temperature of the maximum temperature point sensed by the infrared camera, the first pair of coordinates of the maximum temperature point, and the second pair of coordinates of the expected maximum temperature point obtained through visual tracking.

In some embodiments, an implementation of S403 may include: taking the aforementioned image as the current frame of image as an example, after obtaining the temperature of the maximum temperature point in the current frame of image sensed by the infrared camera, determining whether the temperature of the maximum temperature point sensed by the infrared camera falls within the maximum temperature confidence interval; if the temperature of the maximum temperature point sensed by the infrared camera falls within the maximum temperature confidence interval, determining the expected pair of coordinates according to the following two implementation schemes.

Scheme I: determining the expected pair of coordinates according to the first pair of coordinates of the maximum temperature point in the current frame of image sensed by the infrared camera and the second pair of coordinates of the expected maximum temperature point in the current frame of image.

The implementation of this scheme may include the following approaches, but the disclosed embodiments are not limited thereto.

In one implementation, the first pair of coordinates of the maximum temperature point in the current frame of image and the second pair of coordinates of the expected maximum temperature point in the current frame of image are subjected to an operation of the least squares method to obtain the expected pair of coordinates. For example, the pair of coordinates of the maximum temperature point in the current frame of image sensed by the infrared camera and the pair of coordinates of the expected maximum temperature point in the current frame of image obtained through visual tracking (i.e., the two pairs of coordinates) are subjected to an operation of the least squares method. The calculated result is determined as the expected pair of coordinates.

In another implementation, the expected pair of coordinates is determined according to an average of the first pair of coordinates of the maximum temperature point in the current frame of image and the second pair of coordinates of the expected maximum temperature point in the current frame of image. For example, the average of the pair of coordinates of the maximum temperature point in the current frame of image sensed by the infrared camera and the pair of coordinates of the expected maximum temperature point in the current frame of image obtained through visual tracking (i.e., the two pairs of coordinates) is determined as the expected pair of coordinates.

In yet another implementation, a weighted average of the first pair of coordinates of the maximum temperature point in the current frame of image and the second pair of coordinates of the expected maximum temperature point in the current frame of image is used to determine the expected pair of coordinates. For example, the weighted average of the pair of coordinates of the maximum temperature point in the current frame of image sensed by the infrared camera and the pair of coordinates of the expected maximum temperature point in the current frame of image obtained through visual tracking (i.e., the two pairs of coordinates) is determined as the expected pair of coordinates.

Scheme II: determining the expected pair of coordinates according to the first pair of coordinates of the maximum temperature point in the current frame of image, the second pair of coordinates of the expected maximum temperature point in the current frame of image, the first pairs of coordinates of the maximum temperature points in the N frames of images before the current frame of image, and the second pairs of coordinates of the expected maximum temperature points in the N frames of images before the current frame. Here, the N frames of images before the current frame are consecutive N frames of images in which the temperatures of the maximum temperature points fall within the maximum temperature confidence interval, and N is an integer greater than or equal to 1.

The implementation of this scheme may include the following approaches, but the disclosed embodiments are not limited thereto.

In one implementation, the first pairs of coordinates of the maximum temperature points in the N frames of images before the current frame, the second pairs of coordinates of the expected maximum temperature points in the N frames of images before the current frame, the first pair of coordinates of the maximum temperature point in the current frame of image and the second pair of coordinates of the expected maximum temperature point in the current frame of image are subjected to an operation of the least squares method, to obtain the expected pair of coordinates. For example, the pair of coordinates of the maximum temperature point in the $(T-N)^{th}$ frame of image sensed by the infrared camera and the pair of coordinates of the expected maximum temperature point in the $(T-N)^{th}$ frame of image obtained by visual tracking, the pair of coordinates of the maximum temperature point in the $(T-(N-1))^{th}$ frame of image sensed by the infrared camera and the pair of coordinates of the expected maximum temperature point in the $(T-(N-1))^{th}$ frame of image obtained by visual tracking, . . . , the pair of coordinates of the maximum temperature point in the $(T-1)^{th}$ frame of image sensed by the infrared camera and the pair of coordinates of the expected maximum temperature point in the $(T-1)^{th}$ frame of image obtained by visual tracking, the pair of coordinates of the maximum temperature point in the $T^{th}$ frame of image sensed by the infrared camera and the pair of coordinates of the expected maximum temperature point in the $T^{th}$ frame of image obtained by visual tracking (i.e., the 2*(N+1) number of pairs of coordinates) are subjected to an operation of the least squares method, and the calculated result is determined as the expected pair of coordinates.

In another implementation, determine the expected pair of coordinates according to the average of the first pairs of coordinates of the maximum temperature points in the N frames of images before the current frame, the second pairs of coordinates of the expected maximum temperature points in the N frames of images before the current frame, the first pair of coordinates of the maximum temperature point in the current frame of image and the second pair of coordinates of the expected maximum temperature point in the current frame of image. For example, the average of the pair of coordinates of the maximum temperature point in the $(T-N)^{th}$ frame of image sensed by the infrared camera and the pair of coordinates of the expected maximum temperature point in the $(T-N)^{th}$ frame of image obtained by visual tracking, the pair of coordinates of the maximum temperature point in the $(T-(N-1))^{th}$ frame of image sensed by the infrared camera and the pair of coordinates of the expected maximum temperature point in the $(T-(N-1))^{th}$ frame of image obtained by visual tracking, . . . , the pair of coordinates of the maximum temperature point in the $(T-1)^{th}$ frame of image sensed by the infrared camera and the pair of coordinates of the expected maximum temperature point in the $(T-1)^{th}$ frame of image obtained by visual tracking, the pair of coordinates of the maximum temperature point in the $T^{th}$ frame of image sensed by the infrared camera and the pair of coordinates of the expected maximum temperature point in the $T^{th}$ frame of image obtained by visual tracking (i.e., the 2*(N+1) number of pairs of coordinates) is determined as the expected pair of coordinates.

In yet another implementation, determine the expected pair of coordinates according to the weighted average of the first pairs of coordinates of the maximum temperature points in the N frames of images before the current frame, the second pairs of coordinates of the expected maximum temperature points in the N frames of images before the current frame, the first pair of coordinates of the maximum temperature point in the current frame of image and the second pair of coordinates of the expected maximum temperature point in the current frame of image. For example, the weighted average of the pair of coordinates of the maximum temperature point in the $(T-N)^{th}$ frame of image sensed by the infrared camera and the pair of coordinates of the expected maximum temperature point in the $(T-N)^{th}$ frame of image obtained by visual tracking, the pair of coordinates of the maximum temperature point in the $(T-(N-1))^{th}$ frame of image sensed by the infrared camera and the pair of coordinates of the expected maximum temperature point in the $(T-(N-1))^{th}$ frame of image obtained by visual tracking, . . . , the pair of coordinates of the maximum temperature point in the $(T-1)^{th}$ frame of image sensed by the infrared camera and the pair of coordinates of the expected maximum temperature point in the (T-1)th frame of image obtained by visual tracking, the pair of coordinates of the maximum temperature point in the $T^{th}$ frame of image sensed by the infrared camera and the pair of coordinates of the expected maximum temperature point in the $T^{th}$ frame of image obtained by visual tracking (i.e., the 2*(N+1) number of pairs of coordinates) is determined as the expected pair of coordinates.

Here, the determination of whether the temperature of the maximum temperature point of a frame of image falls within the maximum temperature confidence interval may be achieved by determining whether the variance or standard deviation between the temperature of the maximum temperature point in the frame of image and the temperatures of the maximum temperature points in the K frames of images before the instant frame is smaller than a preset value. For the specific process, refer to the descriptions in the foregoing embodiments, details of which are not described herein again.

In some embodiments, if the temperature of the maximum temperature point in the current frame of image does not fall within the maximum temperature confidence interval, the expected pair of coordinates determined last time is determined as the current expected pair of coordinates. That is, the expected pair of coordinates determined last time is the expected pair of coordinates to be determined in S302.

S404: Determine the rotation angle of the gimbal equipped with the infrared camera according to the expected pair of coordinates and the pair of coordinates of the target position in the image.

S405: Control the gimbal to rotate according to the rotation angle, so as to adjust the maximum temperature point in the image captured by the infrared camera to be located at the target position.

For the specific implementation processes of S404 and S405 in the illustrated embodiment, refer to the related descriptions of the embodiments shown in FIG. 3, details of which are not described herein again.

In the disclosed embodiments, parameters including the temperature and the pair of coordinates of the maximum temperature point of the frame of image sensed by the infrared camera and the pair of coordinates of the maximum temperature point of the frame of image obtained by visual tracking are used to determine the expected pair of coordinates of the maximum temperature point. The expected pair of coordinates of the maximum temperature point determined this way is closer to the actual maximum temperature point, which ensures the maximum temperature point in the next frame of image to be displayed at the target position of the image in real time.

Embodiments of the present disclosure further provide a computer storage medium. The computer storage medium stores program instructions. The program instructions, when executed, may implement some or all steps of the methods for tracking the maximum temperature point, and the corresponding embodiments, as shown in FIG. 2 to FIG. 4.

Figure 5:
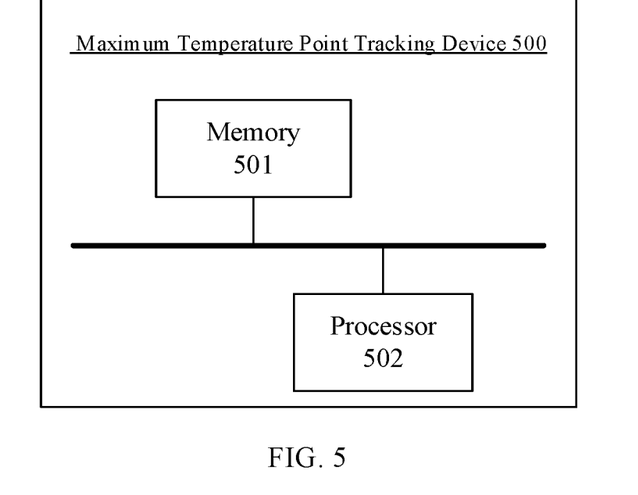
FIG. 5 is a schematic structural diagram of a maximum temperature point tracking device according to an embodiment of the present disclosure.

FIG. 5 is a schematic structural diagram of a maximum temperature point tracking device according to an embodiment of the present disclosure. As shown in FIG. 5, the maximum temperature point tracking device 500 in the illustrated embodiment may include a memory 501 and a processor 502. The processor 502 may be a central processing unit (CPU). The processor 502 may also be another general-purpose processor, a digital signal processor (DSP), an application specific integrated circuit (ASIC), a field-programmable gate array (FPGA) or another programmable logic device, a discrete gate or transistor logic device, a discrete hardware component, etc. A general-purpose processor may be a microprocessor or any other conventional processor or the like.

The memory 501 is configured to store program instructions.

The processor 502 is configured to call the program instructions stored in the memory 501 to: acquire a first pair of coordinates of the maximum temperature point in the image sensed by the infrared camera, where the image is an image captured by the infrared camera; determine the rotation angle of the gimbal equipped with the infrared camera according to the first pair of coordinates of the maximum temperature point and the pair of coordinates of the target position in the image; and control the gimbal to rotate according to the rotation angle, so as to adjust the maximum temperature point in the image captured by the infrared camera to be located at the target position.

In some embodiments, the processor 502 is further configured to obtain a temperature of the maximum temperature point in an image sensed by an infrared camera. In determining the rotation angle of the gimbal equipped with the infrared camera according to the first pair of coordinates of the maximum temperature point and the pair of coordinates of a target position in the image, the processor 502 is specifically configured to: determine an expected pair of coordinates of the maximum temperature point according to the temperature of the maximum temperature point and the first pair of coordinates; and determine the rotation angle of the gimbal according to the expected pair of coordinates and the pair of coordinates of the target position in the image.

In some embodiments, the processor 502 is specifically configured to: when the temperature of the maximum temperature point in the current frame of image sensed by the infrared camera falls within the maximum temperature confidence interval, determine that the first pair of coordinates of the maximum temperature point in the current frame of image is the expected pair of coordinates; or, when the temperature of the maximum temperature point in the current frame of image falls within the maximum temperature confidence interval, determine the expected pair of coordinates according to the first pair of coordinates of the maximum temperature point in the current frame of image and first pairs of coordinates of the maximum temperature points of N frames of images sensed by the infrared camera before the current frame of image. Here, the N frames of images are consecutive N frames of images in which the temperatures of the maximum temperature points fall within the maximum temperature confidence interval, and N is an integer greater than or equal to 1.

In some embodiments, the processor 502 is further configured to: before determining the expected pair of coordinates of the maximum temperature point according to the temperature and the first pair of coordinates of the maximum temperature point, determine a second pair of coordinates of the expected maximum temperature point of the image captured by the infrared camera according to visual tracking. In determining the expected pair of coordinates of the maximum temperature point according to the temperature and the first pair of coordinates of the maximum temperature point, the processor 502 is specifically configured to determine the expected pair of coordinates of the maximum temperature point according to the temperature of the maximum temperature point, the first pair of coordinates, and the second pair of coordinates of the expected maximum temperature point.

In some embodiments, the processor 502 is further configured to obtain a bitstream feature of the expected maximum temperature point before determining the second pair of coordinates of the expected maximum temperature point in the image captured by the infrared camera according to visual tracking. In determining the second pair of coordinates of the maximum temperature point in the image captured by the infrared camera according to visual tracking, the processor 502 is specifically configured to: obtain an infrared bitstream of the image captured by the infrared camera; and visually track the infrared bitstream according to the bitstream feature to determine the second pair of coordinates.

In some embodiments, the processor 502 is specifically configured to determine the bitstream feature of the expected maximum temperature point according to the bitstream features of the maximum temperature points corresponding to the expected pairs of coordinates determined in the previous M times, where M is an integer greater than or equal to 1.

In some embodiments, the processor 502 is specifically configured to: when the temperature of the maximum temperature point in the current frame of image sensed by the infrared camera falls within the maximum temperature confidence interval, determine the expected pair of coordinates according to the first pair of coordinates of the maximum temperature point in the current frame of image sensed by the infrared camera and the second pair of coordinates of the expected maximum temperature point of the current frame of image; or, when the temperature of the maximum temperature point in the current frame of image falls within the maximum temperature confidence interval, determine the expected pair of coordinates according to the first pair of coordinates of the maximum temperature point in the current frame of image and the second pair of coordinates of the expected maximum temperature point in the current frame of image, the first pairs of coordinates of the maximum temperature points in the N frames of images before the current frame of image and the second pairs of coordinates of the expected maximum temperature points in the N frames of images before the current frame of image. Here, the N frames of images are consecutive N frames of images in which the temperatures of the maximum temperature points fall within the maximum temperature confidence interval, and N is an integer greater than or equal to 1.

In some embodiments, the processor 502 is further configured to determine that an expected pair of coordinates determined last time is the current expected pair of coordinates when the temperature of the maximum temperature point in the current frame of image does not fall within the maximum temperature confidence interval.

In some embodiments, in determining whether the temperature of the maximum temperature point in the current frame of image sensed by the infrared camera falls within the maximum temperature confidence interval, the processor 502 is further configured to: when the variance or standard deviation between the temperature of the maximum temperature point in the current frame of image and the temperatures of the maximum temperature points in K frames of images before the current frame is less than a preset value, determine that the temperature of the maximum temperature point in the current frame of image falls within the maximum temperature confidence interval. Here, the K frames of images are continuous K frames of images in which the temperatures of the maximum temperature points fall within the maximum temperature confidence interval, and K is an integer greater than or equal to 1.

In some embodiments, the processor 502 is specifically configured to: perform an operation of a least squares method on at least two pairs of coordinates to obtain the expected pair of coordinates; or determine the expected pair of coordinates according to an average of the at least two pairs of coordinates; or determine the expected pair of coordinates according to a weighted average of the at least two pairs of coordinates. Here, the at least two pairs of coordinates include at least two first pairs of coordinates, or at least one first pair of coordinates and at least one second pair of coordinates.

In some embodiments, the target position is the exact center of an image.

The device in the illustrated embodiment may be configured to implement the technical solutions of the foregoing method embodiments of the present disclosure. The implementation principles and technical effects are similar, details of which are not described herein again.

Figure 6:
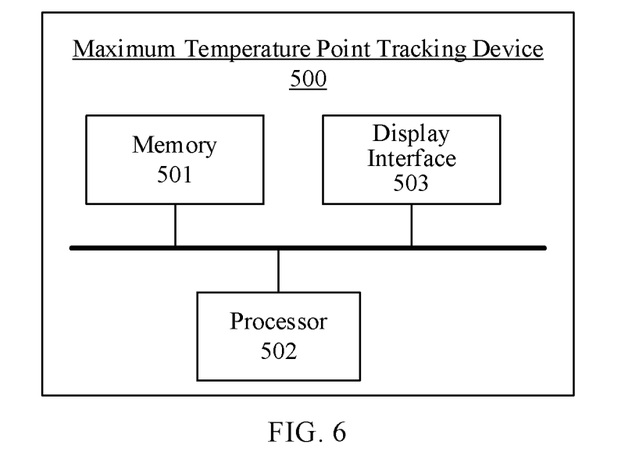
FIG. 6 is a schematic structural diagram of a maximum temperature point tracking device according to another embodiment of the present disclosure.

FIG. 6 is a schematic structural diagram of a maximum temperature point tracking device according to another embodiment of the present disclosure. As shown in FIG. 6, the maximum temperature point tracking device 500 in the illustrated embodiment may further include a display interface 503.

The display interface 503 is configured to display the image captured by the infrared camera after the processor 502 controls the gimbal to rotate, according to the rotation angle, to adjust the maximum temperature point in the image captured by the infrared camera to be located at the target position. Here, the maximum temperature point in the image is located at the target position of the image.

The device in the illustrated embodiment may be configured to implement the technical solutions of the foregoing method embodiments of the present disclosure. The implementation principles and technical effects are similar, details of which are not described herein again.

Figure 7:
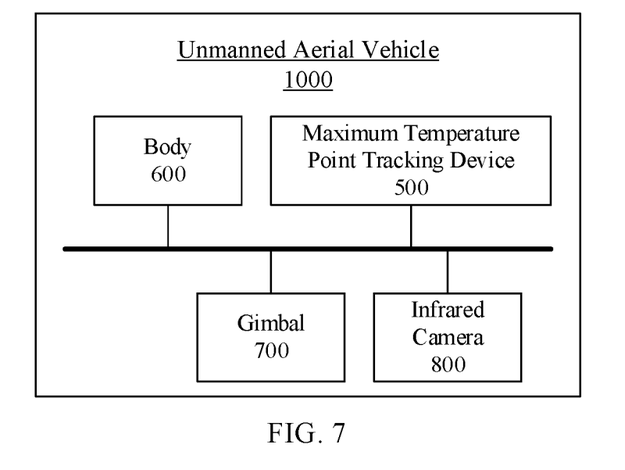
FIG. 7 is a schematic structure diagram of an unmanned aerial vehicle according to an embodiment of the present disclosure.

FIG. 7 is a schematic structural diagram of a UAV according to an embodiment of the present disclosure. As shown in FIG. 7, the UAV 1000 in the illustrated embodiment includes a maximum temperature point tracking device 500, a body 600, a gimbal 700, and an infrared camera 800. The gimbal 700 is connected to the body 600, and is used to carry the infrared camera 800. The maximum temperature point tracking device 500 is communicatively connected to the gimbal 700 and the infrared camera 800, respectively.

Here, the maximum temperature point tracking device 500 may adopt the structure of the embodiments corresponding to FIG. 5 or FIG. 6. Accordingly, the technical solutions of the foregoing method embodiments of the present disclosure may be implemented by the maximum temperature point tracking device 500 shown in FIG. 7. The implementation principles and technical effects are similar, details of which will not be described herein again.

Figure 8:
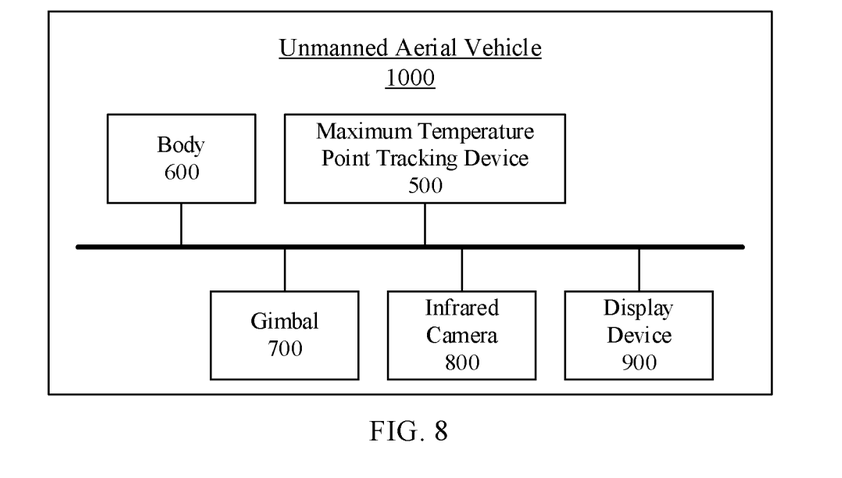
FIG. 8 is a schematic structural diagram of an unmanned aerial vehicle according to another embodiment of the present disclosure.

FIG. 8 is a schematic structural diagram of a UAV according to another embodiment of the present disclosure. As shown in FIG. 8, the UAV 1000 of the illustrated embodiment may further include a display device 900 beyond the components illustrated in the embodiment shown in FIG. 7. Here, the display device 900 is communicatively connected to the infrared camera 800.

The display device 900 is configured to display an image captured by the infrared camera 800, where the maximum temperature point in the image is located at the target position of the image.

It should be noted that the maximum temperature point tracking device 500 may be a part of the flight control system of the UAV 1000, or may be a part of the control device of the ground side of the UAV 1000.

Those of ordinary skill in the art may understand that all or part of the steps of implementing the foregoing method embodiments may be completed by a program that instructs related hardware. The program may be stored in a computer-readable storage medium. When the program is executed, the steps in the foregoing method embodiments are performed. The storage medium includes a read-only memory (ROM), a random-access memory (RAM), a magnetic disk, an optical disk, or various other storage media for storing program codes.

Further, it should be noted that the above embodiments are merely used to illustrate the technical solutions of the present disclosure, but not limited thereto. Although the present disclosure has been described in detail with reference to the foregoing embodiments, those skilled in the art should understand that the technical solutions described in the foregoing embodiments may still be modified, or some or all of the technical features may be equivalently substituted. However, these modifications or substitutions do not deviate the spirits and principles of the corresponding technical solutions from the coverage of the technical solutions of the embodiments of the present disclosure.

What is claimed is:

1. A method for tracking a maximum temperature point, comprising:
    acquiring a first pair of coordinates of a maximum temperature point in a current frame of image sensed by an infrared camera;
    determining an expected pair of coordinates of the maximum temperature point in a subsequent frame of image to be captured by the infrared camera according to a temperature of the maximum temperature point in the current frame of image and the first pair of coordinates;
    determining a rotation angle of a gimbal equipped with the infrared camera according to the expected pair of coordinates of the maximum temperature point in the subsequent frame of image and a pair of coordinates of a target position of the maximum temperature point in the subsequent frame of image; and
    controlling the gimbal to rotate according to the rotation angle, so as to adjust the maximum temperature point in the subsequent frame of image captured by the infrared camera to be located at the target position.

2. The method according to claim 1, further comprising:
    obtaining a temperature of the maximum temperature point in the current frame of image.

3. The method according to claim 1, further comprising, before determining the expected pair of coordinates of the maximum temperature point in the subsequent frame of image to be captured by the infrared camera according to the temperature of the maximum temperature point and the first pair of coordinates:
- determining a second pair of coordinates of an expected maximum temperature point in the current frame of image captured by the infrared camera according to visual tracking;
- wherein determining the expected pair of coordinates of the maximum temperature point in the subsequent frame of image to be captured by the infrared camera according to the temperature of the maximum temperature point and the first pair of coordinates includes:
  - determining the expected pair of coordinates of the maximum temperature point in the subsequent frame of image to be captured by the infrared camera according to the temperature of the maximum temperature point, the first pair of coordinates, and the second pair of coordinates of the expected maximum temperature point.

4. The method according to claim 3, further comprising, before determining the second pair of coordinates of the expected maximum temperature point in the current frame of image captured by the infrared camera according to the visual tracking:
- acquiring a bitstream feature at the expected maximum temperature point;
- wherein determining the second pair of coordinates of the maximum temperature point in the current frame of image captured by the infrared camera according to the visual tracking includes:
  - acquiring an infrared bitstream of the current frame of image captured by the infrared camera, and
  - visually tracking the infrared bitstream according to the bitstream feature to determine the second pair of coordinates.

5. The method according to claim 4, wherein acquiring the bitstream feature at the expected maximum temperature point includes:
- determining the bitstream feature at the expected maximum temperature point according to bitstream features of maximum temperature points corresponding to preceding M expected pairs of coordinates determined in previous M times, wherein M is an integer greater than or equal to 1.

6. The method according to claim 3, wherein determining the expected pair of coordinates of the maximum temperature point in the subsequent frame of image to be captured by the infrared camera according to the temperature of the maximum temperature point, the first pair of coordinates, and the second pair of coordinates includes, in response to the temperature of the maximum temperature point in the current frame of image sensed by the infrared camera falling within the maximum temperature confidence interval:
- determining the expected pair of coordinates according to the first pair of coordinates of the maximum temperature point in the current frame of image and the second pair of coordinates of the expected maximum temperature point in the current frame of image; or
- determining the expected pair of coordinates according to the first pair of coordinates of determining the expected pair of coordinates according to the first pair of coordinates of the maximum temperature point in the current frame of image sensed by the infrared camera, the second pair of coordinates of the expected maximum temperature point in the current frame of image, first pairs of coordinates of maximum temperature points in preceding N frames of images before the current frame of image, and second pairs of coordinates of expected maximum temperature points in the N frames of images before the current frame of image,
- wherein the preceding N frames of images are consecutive N frames of images in which temperatures of the maximum temperature points fall within the maximum temperature confidence interval, and N is an integer greater than or equal to 1.

7. The method according to claim 1, wherein determining the expected pair of coordinates of the maximum temperature point in the subsequent frame of image to be captured by the infrared camera according to the temperature of the maximum temperature point and the first pair of coordinates includes, in response to the temperature of the maximum temperature point in the current frame of image falling within a maximum temperature confidence interval:
- determining the first pair of coordinates of the maximum temperature point in the current frame of image to be the expected pair of coordinates; or
- determining the expected pair of coordinates according to the first pair of coordinates of the maximum temperature point in the current frame of image and first pairs of coordinates of maximum temperature points of preceding N frames of images sensed by the infrared camera before the current frame of image,
- wherein the preceding N frames of images are consecutive N frames of images in which temperatures of the maximum temperature points fall within the maximum temperature confidence interval, and N is an integer greater than or equal to 1.

8. The method according to claim 7, further comprising:
- in response to the temperature of the maximum temperature point in the current frame of image not falling within the maximum temperature confidence interval, determining an expected pair of coordinates determined in a preceding frame of image to be the expected pair of coordinates.

9. The method according to claim 7, wherein the temperature of the maximum temperature point in the current frame of image sensed by the infrared camera is determined as falling within the maximum temperature confidence interval in response to:
- a variance or standard deviation between the temperature of the maximum temperature point in the current frame of image and temperatures of maximum temperature points in preceding K frames of images before the current frame being less than a preset value,
- wherein the preceding K frames of images are continuous consecutive K frames of images in which temperatures of the maximum temperature points fall within the maximum temperature confidence interval, and K is an integer greater than or equal to 1.

10. The method according to claim 7, wherein determining the expected pair of coordinates according to the first pair of coordinates of the maximum temperature point in the current frame of image and the first pairs of coordinates of the maximum temperature points of the preceding N frames of images includes:
- performing an operation of a least squares method on the first pair of coordinates of the maximum temperature point in the current frame of image and the first pairs of coordinates of the maximum temperature points of the preceding N frames of images to obtain the expected pair of coordinates; or determining the expected pair of coordinates according to an average of the first pair of coordinates of the maximum temperature point in the current frame of image and the first pairs of coordinates of the maximum temperature points of the preceding N frames of images; or determining the expected pair of coordinates according to a weighted average of the first pair of coordinates of the maximum temperature point in the current frame of image and the first pairs of coordinates of the maximum temperature points of the preceding N frames of images.

11. The method according to claim 1, further comprising, after controlling the gimbal to rotate according to the rotation angle, so as to adjust the maximum temperature point in the subsequent frame of image captured by the infrared camera to be located at the target position:

displaying the subsequent frame of image captured by the infrared camera on a display interface, wherein the maximum temperature point in the subsequent frame of image is located at the target position of the subsequent frame of image.

12. The method according to claim 1, wherein the target position is an exact center of the subsequent frame of image.

13. An unmanned aerial vehicle, comprising:

a body, a gimbal, an infrared camera, and a maximum temperature point tracking device, wherein the gimbal is connected to the body and is used for carrying the infrared camera, the maximum temperature point tracking device is communicatively connected with the gimbal and the infrared camera, and the maximum temperature point tracking device comprises one or more processors configured to:

acquire a first pair of coordinates of a maximum temperature point sensed by the infrared camera in a current frame of image;

determine an expected pair of coordinates of the maximum temperature point in a subsequent frame of image to be captured by the infrared camera according to a temperature of the maximum temperature point in the current frame of image and the first pair of coordinates;

determine a rotation angle of the gimbal equipped with the infrared camera according to the expected pair of coordinates of the maximum temperature point in the subsequent frame of image and a pair of coordinates of a target position of the maximum temperature point in the subsequent frame of image; and control the gimbal to rotate according to the rotation angle, so as to adjust the maximum temperature point in the subsequent frame of image captured by the infrared camera to be located at the target position.

14. The unmanned aerial vehicle according to claim 13, wherein the one or more processors are further configured to:

obtain a temperature of the maximum temperature point in the current frame of image.

15. The unmanned aerial vehicle according to claim 13, wherein the one or more processors are further configured to, before determining the expected pair of coordinates of the maximum temperature point in the subsequent frame of image to be captured by the infrared camera according to the temperature of the maximum temperature point and the first pair of coordinates:

determine a second pair of coordinates of an expected maximum temperature point in the current frame of image captured by the infrared camera according to visual tracking; and when determining the expected pair of coordinates of the maximum temperature point in the subsequent frame of image to be captured by the infrared camera according to the temperature of the maximum temperature point and the first pair of coordinates:

determine the expected pair of coordinates of the maximum temperature point in the subsequent frame of image to be captured by the infrared camera according to the temperature of the maximum temperature point, the first pair of coordinates, and the second pair of coordinates of the expected maximum temperature point.

16. The unmanned aerial vehicle according to claim 15, wherein:

the one or more processors are further configured to, before determining the second pair of coordinates of the expected maximum temperature point in the current frame of image captured by the infrared camera according to the visual tracking:

acquire a bitstream feature at the expected maximum temperature point; and determining the second pair of coordinates of the maximum temperature point in the current frame of image captured by the infrared camera according to the visual tracking includes:

acquiring an infrared bitstream of the current frame of image captured by the infrared camera, and visually tracking the infrared bitstream according to the bitstream feature to determine the second pair of coordinates.

17. The unmanned aerial vehicle according to claim 16, wherein the one or more processors are further configured to determine the bitstream feature at the expected maximum temperature point according to bitstream features of maximum temperature points corresponding to preceding M expected pairs of coordinates determined, wherein M is an integer greater than or equal to 1.

18. The unmanned aerial vehicle according to claim 15, wherein the one or more processors are further configured to, in response to the temperature of the maximum temperature point in the current frame of image sensed by the infrared camera falling within the maximum temperature confidence interval:

determine the expected pair of coordinates according to the first pair of coordinates of the maximum temperature point in the current frame of image sensed by the infrared camera and the second pair of coordinates of the expected maximum temperature point in the current frame of image; or determine the expected pair of coordinates according to the first pair of coordinates of the determine the expected pair of coordinates according to the first pair of coordinates of the maximum temperature point in the current frame of image sensed by the infrared camera, the second pair of coordinates of the expected maximum temperature point in the current frame of image, first pairs of coordinates of maximum temperature points in preceding N frames of images before the current frame of image, and second pairs of coordinates of expected maximum temperature points in the preceding N frames of images before the current frame of image, wherein the preceding N frames of images are consecutive N frames of images in which temperatures of the maximum temperature points fall within the maximum temperature confidence interval, and N is an integer greater than or equal to 1.

19. The unmanned aerial vehicle according to claim 13, wherein the one or more processors are further configured to, in response to the temperature of the maximum temperature point in the current frame of image sensed by the infrared camera falling within a maximum temperature confidence interval:

determine the first pair of coordinates of the maximum temperature point in the current frame of image to be the expected pair of coordinates; or determine the expected pair of coordinates according to the first pair of coordinates of the maximum temperature point in the current frame of image and first pairs of coordinates of maximum temperature points of preceding N frames of images sensed by the infrared camera before the current frame of image, wherein the preceding N frames of images are consecutive N frames of images in which temperatures of the maximum temperature points fall within the maximum temperature confidence interval, and N is an integer greater than or equal to 1.

20. The unmanned aerial vehicle according to claim 19, wherein the one or more processors are further configured to determine an expected pair of coordinates determined in a preceding frame of image to be the current expected pair of coordinates in response to the temperature of the maximum temperature point in the current frame of image not falling within the maximum temperature confidence interval.

\* \* \* \* \*